United States Patent
Takahashi et al.

(10) Patent No.: US 9,267,835 B2
(45) Date of Patent: Feb. 23, 2016

(54) FAILURE DIAGNOSIS APPARATUS FOR FUEL LEVEL SENSOR AND FAILURE DIAGNOSIS METHOD FOR FUEL LEVEL SENSOR

(71) Applicant: NISSAN MOTOR CO., LTD., Yokohama-shi, Kanagawa (JP)

(72) Inventors: Akio Takahashi, Kanagawa (JP); Shinsuke Takakura, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/418,113
(22) PCT Filed: Jul. 23, 2013
(86) PCT No.: PCT/JP2013/069862
§ 371 (c)(1),
(2) Date: Jan. 29, 2015
(87) PCT Pub. No.: WO2014/021136
PCT Pub. Date: Feb. 6, 2014

(65) Prior Publication Data
US 2015/0285670 A1  Oct. 8, 2015

(30) Foreign Application Priority Data
Aug. 2, 2012  (JP) ................. 2012-172258

(51) Int. Cl.
G01F 25/00 (2006.01)
F02D 41/22 (2006.01)
F02M 37/10 (2006.01)
B60K 15/03 (2006.01)

(52) U.S. Cl.
CPC .......... *G01F 25/0061* (2013.01); *F02D 41/222* (2013.01); *F02M 37/106* (2013.01);
(Continued)

(58) Field of Classification Search
CPC .......... G01F 9/02; G01F 9/023; G01F 9/008; G01F 25/0061; G01F 25/0084; G01F 25/0092; G01F 25/0038; G01F 25/0007; G01F 25/00; G01F 9/00; G01F 9/001; F02D 41/222; F02D 2041/223; F02D 2041/224; F02D 2041/228
USPC ................ 73/1.73, 861, 290 R, 311
See application file for complete search history.

(56) References Cited

U.S. PATENT DOCUMENTS

| 4,773,260 A * | 9/1988 | Ohno ................. F02M 37/0094 73/114.54 |
| 2006/0027017 A1* | 2/2006 | Kamatsuke ........ F02M 37/0082 73/290 R |

(Continued)

FOREIGN PATENT DOCUMENTS

| JP | H10-184479 A | 7/1998 |
| JP | 2008-514905 A | 5/2008 |
| JP | 2008-128068 A | 6/2008 |

*Primary Examiner* — Lisa Caputo
*Assistant Examiner* — Philip Cotey
(74) *Attorney, Agent, or Firm* — Drinker Biddle & Reath LLP

(57) ABSTRACT

A failure diagnosis apparatus for a fuel level sensor that detects a fuel remaining quantity within a fuel tank including at least a first tank and a second tank includes: a range determining unit for determining a range of a fuel remaining quantity on the basis of an output value of the fuel level sensor, the range being classified into a plurality of ranges in accordance with an output characteristic of the fuel level sensor; and a range failure diagnosis unit for carrying out failure diagnosis of the fuel level sensor for each range by comparing a fuel consumption quantity since the ranges are changed with a failure determining threshold value individually set up for each range. In a dead zone range in which a change in the output value of the fuel level sensor becomes small when a fuel consumer is switched from the first tank to the second tank, the range failure diagnosis unit sets the failure determining threshold value to a value corresponding to a fuel consumption quantity required to pass through the dead zone range.

4 Claims, 5 Drawing Sheets

(52) U.S. Cl.
CPC . *B60K2015/03217* (2013.01); *F02D 2041/224* (2013.01); *F02D 2200/0625* (2013.01); *Y02T 10/40* (2013.01)

(56) References Cited

U.S. PATENT DOCUMENTS

| | | | | |
|---|---|---|---|---|
| 2007/0266762 | A1* | 11/2007 | Rumpf | F02M 37/025 73/1.73 |
| 2008/0028851 | A1* | 2/2008 | Moening | B60K 15/061 73/290 R |
| 2008/0245129 | A1* | 10/2008 | Wang | G01F 25/0061 73/1.73 |
| 2008/0245130 | A1* | 10/2008 | Wang | G01F 25/0061 73/1.73 |
| 2008/0255755 | A1* | 10/2008 | Chen | G01F 9/008 701/123 |

* cited by examiner

FAILURE DIAGNOSIS APPARATUS FOR FUEL LEVEL SENSOR AND FAILURE DIAGNOSIS METHOD FOR FUEL LEVEL SENSOR

TECHNICAL FIELD

The present invention relates to a failure diagnosis apparatus for a fuel level sensor and a failure diagnosis method for the fuel level sensor.

BACKGROUND ART

A conventional failure diagnosis apparatus for a fuel level sensor described in JP10-184479A has determined that the fuel level sensor failed (broke down) in a case where an amount of change in an output value of the fuel level sensor when to consume predetermined fuel is smaller than a predetermined failure determining threshold value.

SUMMARY OF THE INVENTION

However, in the conventional failure diagnosis apparatus for a fuel level sensor described above, there has been a problem that erroneous determination may be carried out in a case where there is a dead zone range, in which an output value of the fuel level sensor hardly changes temporarily, in the middle of consumption of the fuel.

The present invention has been made by focusing on such a problem. It is an object of the present invention to inhibit erroneous determination from being carried out in failure diagnosis of a fuel level sensor.

According to an aspect of the present invention, there is provided a failure diagnosis apparatus for a fuel level sensor that detects a fuel remaining quantity within a fuel tank including at least a first tank and a second tank. Further, the failure diagnosis apparatus for the fuel level sensor includes: a range determining unit for deter mining a range of a fuel remaining quantity on the basis of an output value of the fuel level sensor, the range being classified into a plurality of ranges in accordance with an output characteristic of the fuel level sensor; and a range failure diagnosis unit for carrying out failure diagnosis of the fuel level sensor for each range by comparing a fuel consumption quantity since the ranges are changed with a failure determining threshold value individually set up for each range. In this case, in a dead zone range in which a change in the output value of the fuel level sensor becomes small when a fuel consumer is switched from the first tank to the second tank, the range failure diagnosis unit sets the failure determining threshold value to a value corresponding to a fuel consumption quantity required to pass through the dead zone range.

DESCRIPTION OF THE EMBODIMENT

Hereinafter, one embodiment of the present invention will be described with reference to the accompanying drawings.

Figure 1:
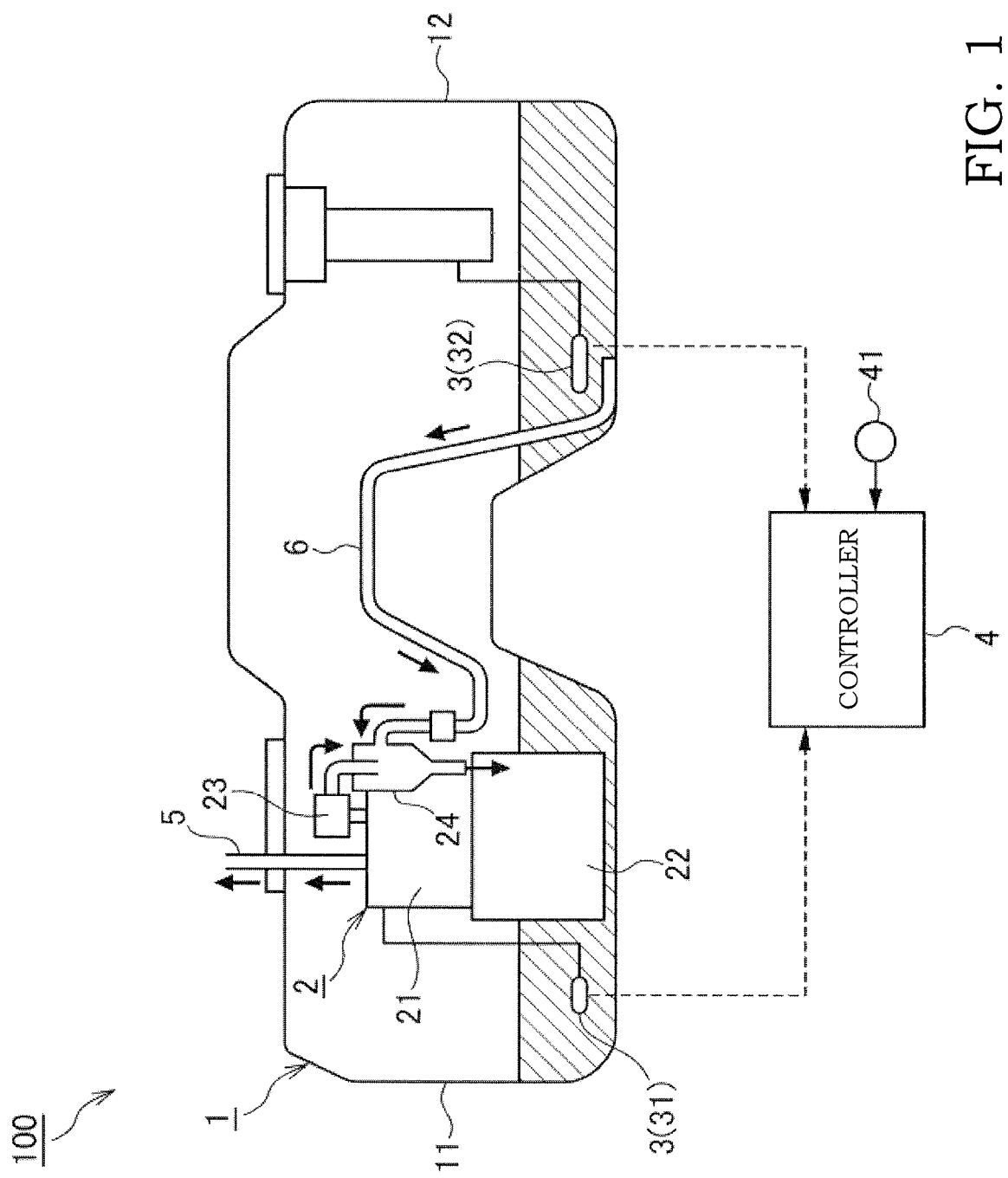
FIG. 1 is a schematic configuration diagram of a fuel supply apparatus according to one embodiment of the present invention.

FIG. 1 is a schematic configuration diagram of a fuel supply apparatus 100 according to one embodiment of the present invention.

The fuel supply apparatus 100 is mounted on a vehicle that includes an engine, or the like. The fuel supply apparatus 100 includes a fuel tank 1, a pump module 2, a fuel level sensor 3, and a controller 4.

The fuel tank 1 is a saddle-shaped tank, and includes a main tank 11 and a sub tank 12. Fuel within the fuel tank 1 is consumed from fuel within the sub tank 12.

The pump module 2 is provided in the main tank 11, and includes a fuel pump 21, a fuel filter 22, a pressure regulator 23, and a jet pump 24.

The fuel pump 21 draws (or pumps) the fuel within the fuel tank 1, and supplies the fuel within the fuel tank 1 to the engine via a fuel pipe 5.

The fuel filter 22 is provided downstream of the fuel pump 21. The fuel filter 22 removes foreign substances contained in the fuel within the fuel tank 1.

The pressure regulator 23 keeps a pressure of the fuel to be supplied constant by returning an excess of the fuel drawn by the fuel pump 21 to the inside of the fuel tank 1.

The jet pump 24 sucks up the fuel in the sub tank 12 using a negative pressure generated when the fuel returned into the fuel tank 1 from the pressure regulator 23 passes through a venturi within the jet pump 24, and sends the sucked-up fuel into the main tank 11 through a transfer pipe 6.

The fuel level sensor 3 includes a main sensor 31 attached to the pump module 2 and a sub sensor 32 installed in the sub tank 12 to detect a fuel remaining quantity within the fuel tank 1. The fuel level sensor 3 inputs a voltage value (hereinafter, referred to as a "level sensor output value") FL according to the fuel remaining quantity within the fuel tank 1 into the controller 4.

The controller 4 is configured by a microcomputer that includes a central processing unit (CPU), a read only memory (ROM), a random access memory (RAM) and an input/output interface (I/O interface). Signals detected by various kinds of sensors required for traveling of the vehicle, such as a vehicle speed sensor 41 for detecting a vehicle speed, are inputted into the controller 4 in addition to the detected signal by the fuel level sensor 3 (the level sensor output value FL) described above.

The controller 4 controls the engine on the basis of the inputted signals detected by the various kinds of sensors, and carries out failure diagnosis of the fuel level sensor 3. Here, in the present embodiment, the failure diagnosis of the fuel level sensor 3 is carried out in view of an output characteristic of the fuel level sensor 3.

Figure 2:
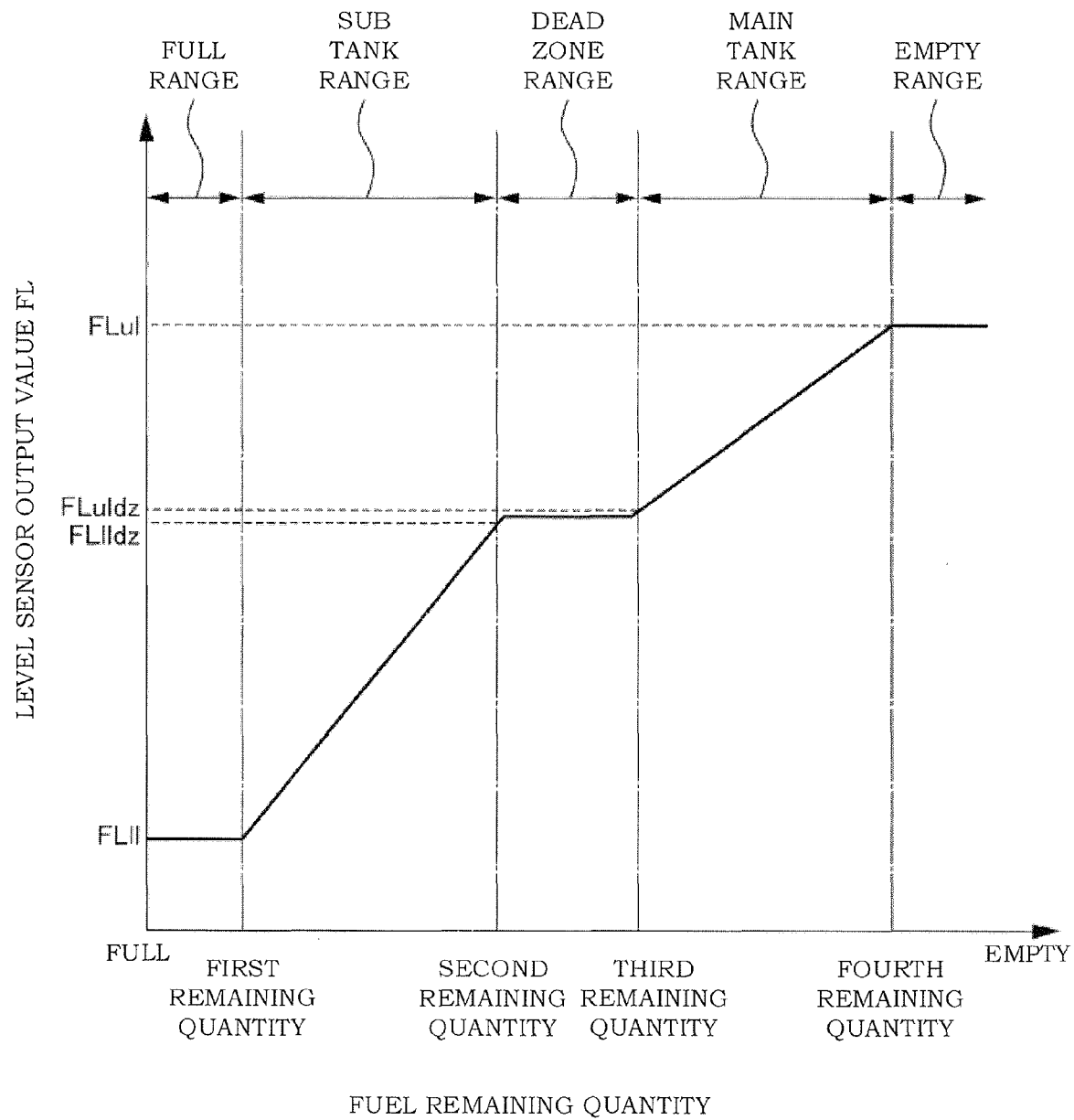
FIG. 2 is a drawing for explaining an output characteristic of a fuel level sensor.

FIG. 2 is a drawing for explaining the output characteristic of the fuel level sensor 3.

As shown in FIG. 2, the level sensor output value FL hardly changes at a predetermined lower limit $FL_{ll}$ in a range in which the fuel remaining quantity is larger than a predetermined first remaining quantity (hereinafter, referred to as a "full range"), and also hardly changes at a predetermined upper limit $FL_{ul}$ in a range in which the fuel remaining quantity is smaller than a predetermined fourth remaining quantity (hereinafter, referred to as an "empty range").

On the other hand, in a range from the first remaining quantity to the fourth remaining quantity, the level sensor output value FL increases basically as the fuel remaining quantity decreases. In this regard, a range in which the fuel remaining quantity becomes from the first remaining quantity to a predetermined second remaining quantity (hereinafter, referred to as a "sub tank range") is a range in which the fuel within the sub tank 12 is consumed. A range in which the fuel remaining quantity becomes from a third remaining quantity to the predetermined fourth remaining quantity (hereinafter, referred to as a "main tank range") is a range in which the fuel within the main tank 11 is consumed. As shown in FIG. 2, a change in the level sensor output value FL with respect to a change in the fuel remaining quantity becomes larger in the sub tank range than that in the main tank range.

Here, in a case where the fuel tank 1 has a saddle shape like the present embodiment, a state is switched from a state where the fuel within the sub tank 12 is consumed to a state where the fuel within the main tank 11 is consumed in the middle of the consumption of the fuel. In a range before and after this switching, that is, a range in which the fuel remaining quantity becomes from the predetermined second remaining quantity to the third remaining quantity, a "dead zone range" in which the level sensor output value FL hardly changes even though the fuel is consumed is generated.

Therefore, for example, in a method of determining that the fuel level sensor 3 breaks down in a case where the amount of change in the level sensor output value FL when predetermined fuel is consumed is smaller than a failure determining threshold value, there has been a fear that erroneous determination is carried out in this dead zone range.

Thus, in the present embodiment, by changing this failure determining threshold value in accordance with the range of the fuel remaining quantity, it is possible to inhibit erroneous determination, and it is also possible to ensure an execution frequency of the failure diagnosis. Hereinafter, this failure diagnosis of the fuel level sensor 3 according to the present embodiment will be described.

Figure 3:
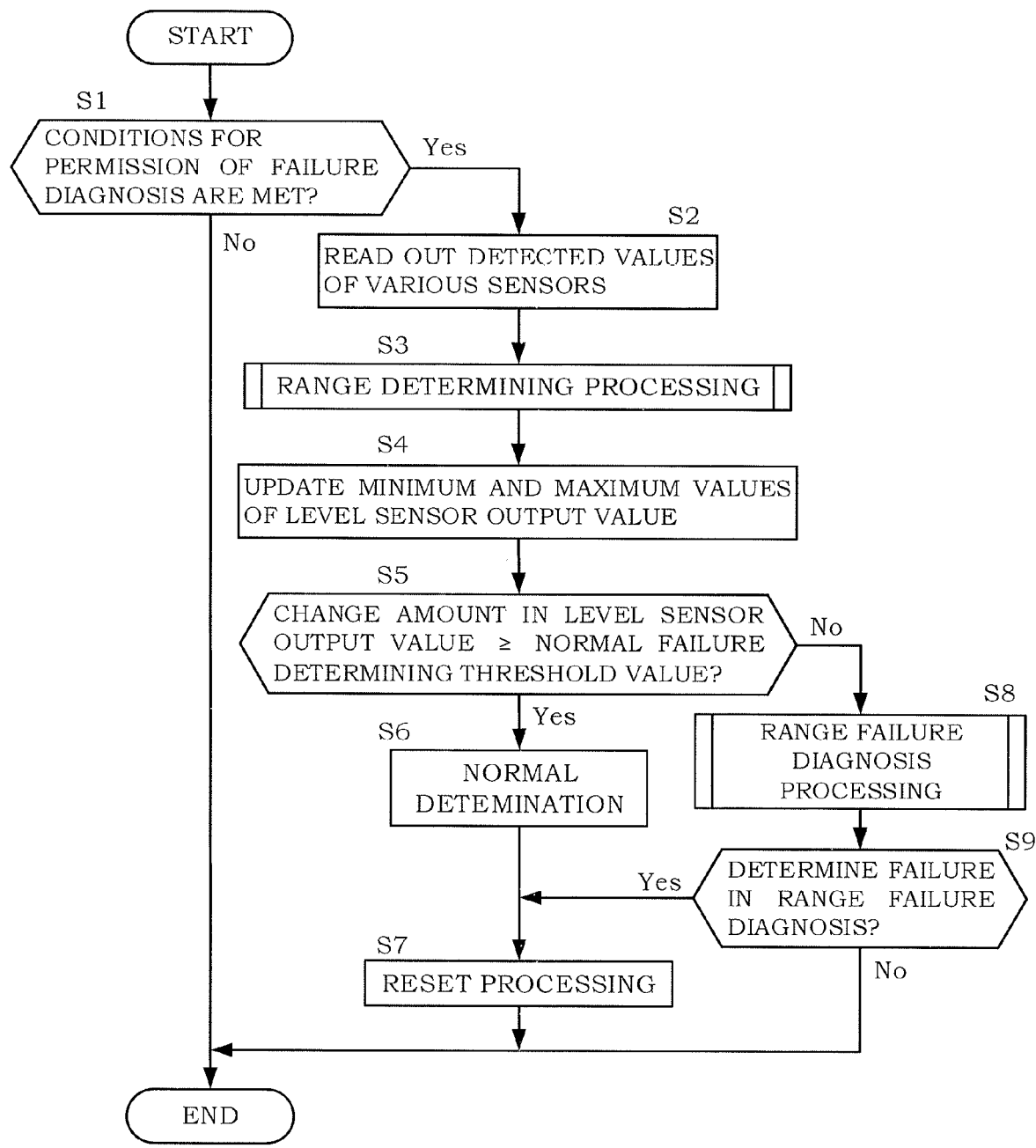
FIG. 3 is a flowchart for explaining failure diagnosis of the fuel level sensor according to one embodiment of the present invention.

FIG. 3 is a flowchart for explaining the failure diagnosis of the fuel level sensor 3 according to the present embodiment. The controller 4 repeatedly carries out the present routine in a predetermined operation period.

At Step S1, the controller 4 determines whether conditions for permission to carry out failure diagnosis of the fuel level sensor 3 are met or not. In a case where the conditions for permission are not met, the controller 4 terminates the processing this time. In a case where the conditions for permission are met, the controller 4 carries out a process at Step S2. In this regard, as the conditions for permission, there are a condition that a distinct failure, such as breaking of wire or short circuit, does not occur in the various kinds of sensors described above, a condition that an abnormality occurs in CAN communication and the like.

At Step S2, the controller 4 reads out detected values of the various kinds of sensors.

At Step S3, the controller 4 carries out range determining processing for the fuel remaining quantity. Details of the range determining processing will be described later with reference to FIG. 4.

At Step S4, the controller 4 updates the minimum value and the maximum value of the level sensor output value FL since reset processing (will be described later) is carried out on the basis of the detected level sensor output value FL. In this regard, the minimum value basically becomes the level sensor output value FL immediately after the reset processing. On the other hand, because the level sensor output value FL increases as the fuel is consumed since the reset processing was carried out, the maximum value is basically updated whenever the level sensor output value FL is detected.

At Step S5, the controller 4 carries out normal failure diagnosis processing for the fuel level sensor 3. More specifically, the controller 4 deter mines whether the amount of change in the level sensor output value FL since the reset processing was carried out, that is, a difference between the maximum value and the minimum value mentioned above becomes a predetermined nominal failure determining threshold value $FL_{nor}$ or more. In a case where the amount of change in the level sensor output value FL is the nominal failure determining threshold value $FL_{nor}$ or more, the controller 4 carries out a process at Step S6. Otherwise, the controller 4 carries out a process at Step S8.

At Step S6, the controller 4 determines that the fuel level sensor 3 is normal because the level sensor output value FL changes.

At Step S7, the controller 4 carries out reset processing. More specifically, the controller 4 initializes the minimum value and the maximum value of the level sensor output value FL.

At Step S8, the controller 4 carries out range failure diagnosis processing for the fuel level sensor 3, which is individually carried out in accordance with the range of the fuel remaining quantity. Details of the range failure diagnosis processing for the fuel level sensor 3 will be described later with reference to FIG. 5.

At Step S9, the controller 4 determines whether it is determined that the fuel level sensor 3 breaks down in the range failure diagnosis processing or not. In a case where it is determined that the fuel level sensor 3 breaks down in the range failure diagnosis processing, the controller 4 carries out a process at Step S7. Otherwise, the controller 4 terminates the processing this time.

Figure 4:
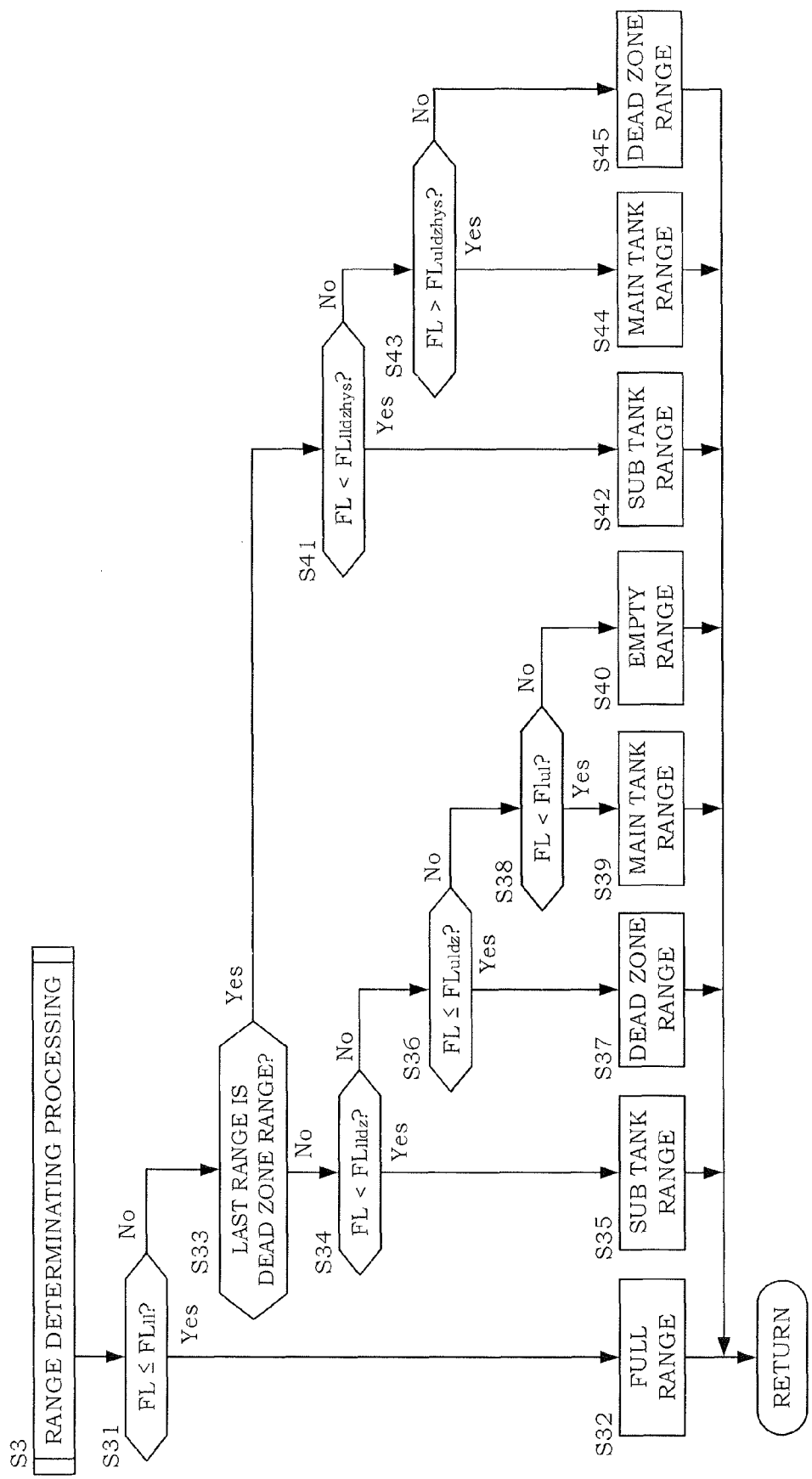
FIG. 4 is a flowchart for explaining range determining processing for a fuel remaining quantity.

FIG. 4 is a flowchart for explaining the range determining processing for the fuel remaining quantity.

At Step S31, the controller 4 determines whether or not the level sensor output value FL is the lower limit $FL_{ll}$ or lower. In a case where the level sensor output value FL is the lower limit $FL_{ll}$ or lower, the controller 4 carries out a process at Step S32. Otherwise, the controller 4 carries out a process at Step S33.

At Step S32, the controller 4 determines that the range is the full range.

At Step S33, the controller 4 determines whether the range of the fuel remaining quantity last time is in the dead zone range or not. In a case where it is determined that the range of the fuel remaining quantity last time is not in the dead zone range, the controller 4 carries out a process at Step S34. In a case where it is determined that the range is in the dead zone range, the controller 4 carries out a process at Step S41.

At Step S34, the controller 4 determines whether the level sensor output value FL is smaller than a lower limit side dead zone determining threshold value $FL_{lldz}$ (see FIG. 2) or not. In a case where the level sensor output value FL is smaller than the lower limit side dead zone determining threshold value $FL_{lldz}$, the controller 4 carries out a process at Step S35. Otherwise, the controller 4 carries out a process at Step S36.

At Step S35, the controller 4 determines that the range is the sub tank range.

At Step S36, the controller 4 determines whether or not the level sensor output value FL is an upper limit side dead zone determining threshold value $FL_{uldz}$ (see FIG. 2) or less. In a case where the level sensor output value FL is the upper limit side dead zone determining threshold value $FL_{uldz}$ or less, the controller 4 carries out a process at Step S37. Otherwise, the controller 4 carries out a process at Step S38.

At Step S37, the controller 4 determines that the range is the dead zone range.

At Step S38, the controller 4 determines whether the level sensor output value FL is smaller than the upper limit $FL_{ul}$ or not. In a case where the level sensor output value FL is smaller than the upper limit $FL_{ul}$, the controller 4 carries out a process at Step S39. Otherwise, the controller 4 carries out a process at Step S40.

At Step S39, the controller 4 determines that the range is the main tank range.

At Step S40, the controller 4 determines that the range is the empty range.

At Step S41, the controller 4 determines whether the level sensor output value FL is smaller than a lower limit side hysteresis threshold value $FL_{lldzhys}$ obtained by subtracting a predetermined hysteresis value from the lower limit side dead zone deter mining threshold value $FL_{lldz}$ or not. In a case where it is determined that the level sensor output value FL is smaller than the lower limit side hysteresis threshold value $FL_{lldxhys}$, the controller 4 carries out a process at Step S42. Otherwise, the controller 4 carries out a process at Step S43.

At Step S42, the controller 4 determines that the range is the sub tank range.

At Step S43, the controller 4 determines whether the level sensor output value FL is larger than an upper limit side hysteresis threshold value $FL_{uldzhys}$ obtained by adding a predetermined hysteresis value to the upper limit side dead zone determining threshold value $FL_{uldz}$ or not. In a case where it is determined that the level sensor output value FL is larger than the upper limit side hysteresis threshold value $FL_{uldzhys}$, the controller 4 carries out a process at Step S44. Otherwise, the controller 4 carries out a process at Step S45.

At Step S44, the controller 4 determines that the range is the main tank range.

At Step S45, the controller 4 determines that the range is the dead zone range. In this way, once the range enters the dead zone range, it is determined that the range is the dead zone range until the range passes through the inside of a predetermined hysteresis range ($FL_{lldzhys} \leq FL \leq FL_{uldzhys}$) in view of an influence of noise or the like.

Figure 5:
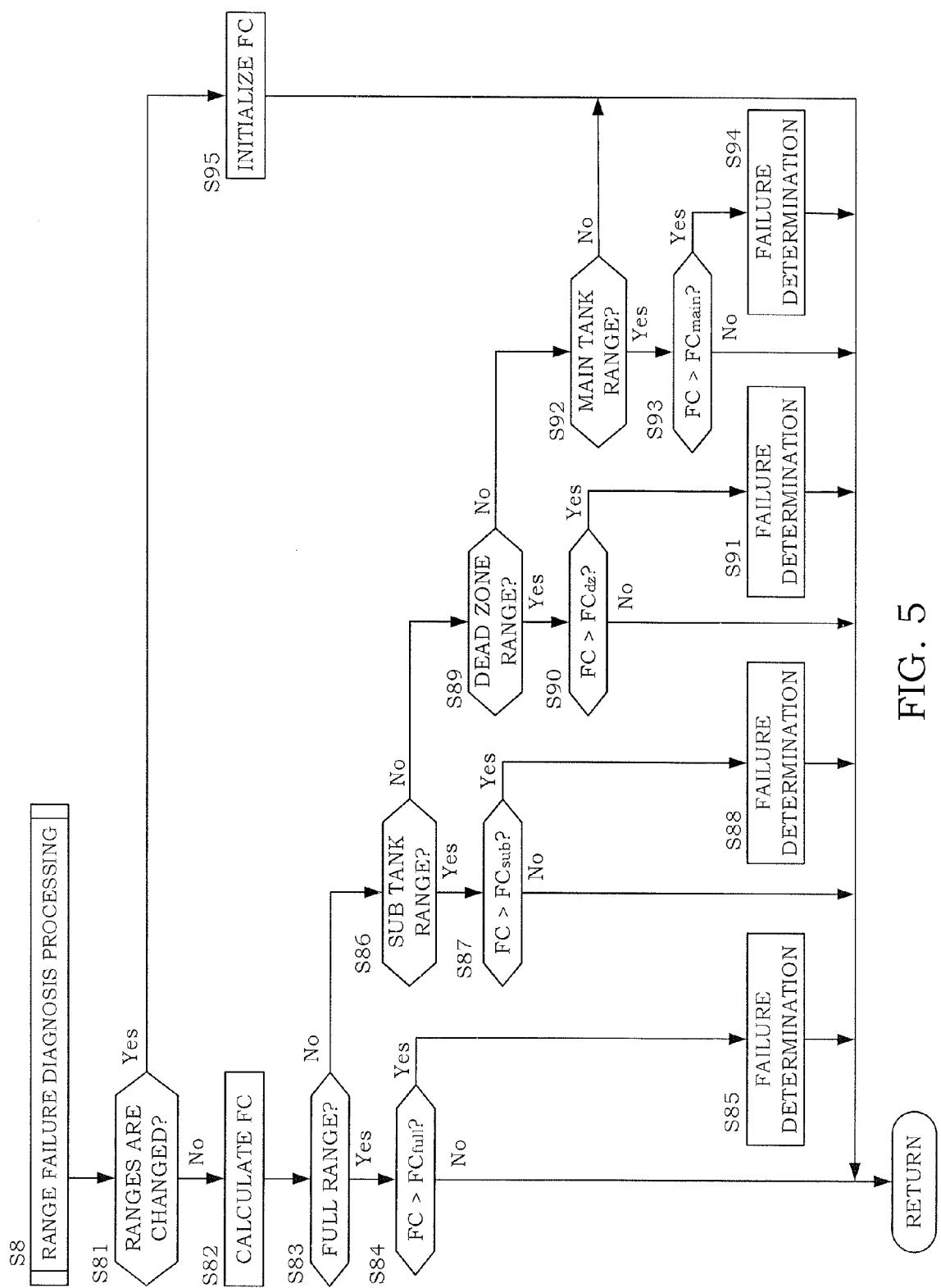
FIG. 5 is a flowchart for explaining range failure diagnosis processing for the fuel level sensor.

FIG. 5 is a flowchart for explaining the range failure diagnosis processing for the fuel level sensor 3.

At Step S81, the controller 4 determines whether the range of the fuel remaining quantity is changed or not. More specifically, the controller 4 determines whether the range of the fuel remaining quantity determined previous time is different from the range of the fuel remaining quantity determined this time or not. In a case where the range of the fuel remaining quantity changes, the controller 4 carries out a process at Step S95. In a case where the range does not change, the controller 4 carries out a process at Step S82.

At Step S82, the controller 4 calculates, on the basis of the vehicle speed and the like, a traveling distance since the range of the fuel remaining quantity changes, and estimates a fuel consumption quantity corresponding to the traveling distance. Hereinafter, this estimated fuel consumption quantity is referred to as an "estimated fuel consumption quantity FC".

At Step S83, the controller 4 determines whether the range of the fuel remaining quantity is in the full range or not. In a case where the range is in the full range, the controller 4 carries out a process at Step S84. Otherwise, the controller 4 carries out a process at Step S86.

At Step S84, the controller 4 determines whether the estimated fuel consumption quantity FC becomes larger than the full range failure determining threshold value $FC_{full}$ or not. The full range failure determining threshold value $FC_{full}$ is a value obtained by subtracting the first remaining quantity from full fuel. In a case where the fuel level sensor 3 is normal, the full range failure determining threshold value $FC_{full}$ is a value at which the range of the fuel remaining quantity is always switched into the sub tank range when the fuel of the full range failure determining threshold value $FC_{full}$ is consumed. In a case where the estimated fuel consumption quantity FC becomes larger than the full range failure deter mining threshold value $FC_{full}$, the controller 4 carries out a process at Step S85. Otherwise, the controller 4 terminates the processing this time.

At Step S85, the controller 4 determines that the fuel level sensor 3 breaks down, and returns the estimated fuel consumption quantity FC to an initial value (zero). The reason why it is determined that the fuel level sensor 3 breaks down at this Step S85 is as follows.

Since the level sensor output value FL hardly changes in the full range, the amount of change in the level sensor output value FL never becomes the normal failure determining threshold value or more at Step S5. However, in a case where the fuel level sensor 3 is normal, the range of the fuel remaining quantity should always be switched into the sub tank range when the fuel of the full range failure determining threshold value $FC_{full}$ is consumed. Therefore, in a case where it is determined that the range of the fuel remaining quantity does not change at Step S81 and the processing proceeds to this Step in spite that the fuel of the full range failure determining threshold value $FC_{full}$ is consumed (that is, the estimated fuel consumption quantity FC becomes larger than the full range failure deter mining threshold value $FC_{full}$), it is possible to determine that the fuel level sensor 3 breaks down.

At Step S86, the controller 4 determines whether the range of the fuel remaining quantity is in the sub tank range or not. In a case where the range is in the sub tank range, the controller 4 carries out a process at Step S87. In a case where the range is not in the sub tank range, the controller 4 carries out a process at Step S89.

At Step S87, the controller 4 determines whether the estimated fuel consumption quantity FC becomes larger than a sub tank range failure determining threshold value $FC_{sub}$ or not. The sub tank range failure determining threshold value $FC_{sub}$ is a value corresponding to a fuel consumption quantity necessary for the level sensor output value FL to change by the not mal failure determining threshold value in the sub tank range. In a case where the estimated fuel consumption quantity FC becomes larger than the sub tank range failure determining threshold value $FC_{sub}$, the controller 4 carries out a process at Step S88. Otherwise, the controller 4 terminates the processing this time.

At Step S88, the controller 4 determines that the fuel level sensor 3 breaks down, and returns the estimated fuel consumption quantity FC to the initial value (zero). The reason why it is determined that the fuel level sensor 3 breaks down at this Step S88 is as follows.

In the sub tank range, the level sensor output value FL increases as the fuel is consumed. Therefore, in a case where the fuel level sensor 3 is normal, the amount of change in the level sensor output value FL should become the not teal failure determining threshold value or more at Step S5 when the fuel of the sub tank range failure determining threshold value $FC_{sub}$ is consumed (that is, the estimated fuel consumption quantity FC becomes larger than the sub tank range failure determining threshold value $FC_{sub}$). Nevertheless, in a case where it is not deter mined at Step S5 that the amount of change in the level sensor output value FL is the normal failure determining threshold value or more and the processing reaches this Step, it is possible to determine that the fuel level sensor 3 breaks down.

At Step S89, the controller 4 determines whether the range of the fuel remaining quantity is in the dead zone range or not. In a case where the range is in the dead zone range, the controller 4 carries out a process at Step S90. Otherwise, the controller 4 carries out a process at Step S92.

At Step S90, the controller 4 determines whether the estimated fuel consumption quantity FC becomes larger than a dead zone range failure deter mining threshold value $FC_{dz}$ or not. In a case where the fuel level sensor 3 is normal, the dead zone range failure determining threshold value $FC_{dz}$ is a value at which the range of the fuel remaining quantity is always switched into the main tank range when the fuel of the dead zone range failure determining threshold value $FC_{dz}$ is consumed. Therefore, the dead zone range failure determining threshold value $FC_{dz}$ is substantially the same as a value obtained by subtracting the third remaining quantity from the second remaining quantity, and becomes a value to be set up also taking into account the hysteresis range. In a case where the estimated fuel consumption quantity FC is larger than the dead zone range failure determining threshold value $FC_{dz}$, the controller 4 carries out a process at Step S91. Otherwise, the controller 4 terminates the processing this time.

At Step S91, the controller 4 determines that the fuel level sensor 3 breaks down, and returns the estimated fuel consumption quantity FC to the initial value (zero). The reason why it is determined that the fuel level sensor 3 breaks down at this Step S91 is as follows.

Since the level sensor output value FL hardly changes in the dead zone range, the amount of change in the level sensor output value FL never becomes the normal failure determining threshold value or more at Step S5. However, in a case where the fuel level sensor 3 is normal, the range of the fuel remaining quantity should always be switched into the main tank range when the fuel of the dead zone range failure determining threshold value $FC_{dz}$, is consumed. Therefore, in a case where it is deter mined that the range of the fuel remaining quantity does not change at Step S81 and the processing proceeds to this Step in spite that the fuel of the dead zone range failure determining threshold value $FC_{sz}$ is consumed (that is, the estimated fuel consumption quantity FC becomes larger than the dead zone range failure determining threshold value $FC_{dz}$), it is possible to determine that the fuel level sensor 3 breaks down.

At Step S92, the controller 4 determines whether the range of the fuel remaining quantity is in the main tank range or not. In a case where it is deter mined that the range is in the main tank range, the controller 4 carries out a process at Step S93. Otherwise, the controller 4 terminates the processing this time.

At Step S93, the controller 4 determines whether the estimated fuel consumption quantity FC becomes larger than a main tank range failure determining threshold value $FC_{main}$ or not. The main tank range failure determining threshold value $FC_{main}$ is a value corresponding to the fuel consumption quantity necessary for the level sensor output value FL to change by the normal failure determining threshold value in the main tank range. In a case where it is determined that the estimated fuel consumption quantity FC becomes larger than the main tank range failure determining threshold value $FC_{main}$, the controller 4 carries out a process at Step S94. Otherwise, the controller 4 terminates the processing this time.

At Step S94, the controller 4 determines that the fuel level sensor 3 breaks down, and returns the estimated fuel consumption quantity FC to the initial value (zero). The reason why it is determined that the fuel level sensor 3 breaks down at this Step S94 is as follows.

In the main tank range, the level sensor output value FL increases as the fuel is consumed. Therefore, in a case where the fuel level sensor 3 is normal, the amount of change in the level sensor output value FL should become the normal failure determining threshold value or more at Step S5 when the fuel of the main tank range failure determining threshold value $FC_{main}$ is consumed (that is, the estimated fuel consumption quantity FC becomes larger than the main tank range failure determining threshold value $FC_{main}$). Nevertheless, in a case where it is not determined at Step S5 that the amount of change in the level sensor output value FL is the normal failure determining threshold value or more and the processing reaches this Step, it is possible to determine that the fuel level sensor 3 breaks down.

At Step S95, the controller 4 returns the estimated fuel consumption quantity FC to the initial value (zero).

According to the present embodiment that has been explained above, the failure diagnosis (range failure diagnosis) for the fuel level sensor 3 is individually carried out for each range of the fuel remaining quantity classified on the basis of the output characteristic of the fuel level sensor 3 in addition to carry out the failure diagnosis (normal failure diagnosis) for the fuel level sensor 3 by regularly comparing the amount of change in the level sensor output value FL with the predetermined normal failure determining threshold value.

In this way, by regularly carrying out the normal failure diagnosis, and individually carrying out the range failure diagnosis of each range of the fuel remaining quantity, it is possible to increase the number of total times of the failure diagnosis of the fuel level sensor 3.

Further, in the range failure diagnosis, it is possible to individually set up the failure determining threshold value according to the output characteristic of the fuel level sensor 3 for each range of the fuel remaining quantity. For that reason, particularly like the present embodiment, in a case of the output characteristic in which the output characteristic of the fuel level sensor 3 has the dead zone range, that is, in a case of having a characteristic in which the level sensor output value hardly changes temporarily in the middle of consumption of the fuel, it is possible to inhibit erroneous determination, and this makes it possible to improve accuracy of the failure diagnosis by appropriately adjusting the failure determining threshold value in the dead zone range.

In the present embodiment, the failure determining threshold value in the dead zone range (the dead zone range failure determining threshold value $FC_{dz}$) was set to the value corresponding to the fuel consumption quantity required to pass through the dead zone range. In a case where the range of the fuel remaining quantity is in the dead zone range, it is determined that the fuel level sensor 3 breaks down when it continues to be determined that the range of the fuel remaining quantity is in the dead zone range even though the fuel consumption quantity since the range enters the dead zone range exceeds the fuel consumption quantity required to pass through the dead zone range.

This makes it possible to inhibit erroneous determination in the dead zone range surely, and it is possible to improve accuracy of the failure diagnosis further.

Further, according to the present embodiment, the failure determining threshold values in the sub tank range and the main tank range (the sub tank range failure determining threshold value $FC_{sub}$ and the main tank range failure determining threshold value $FC_{main}$) are set to the values corresponding to the fuel consumption quantities necessary for the level sensor output value FL to change by the normal failure determining threshold value in the respective ranges.

In a case where no range failure diagnosis is carried out and it is not determined whether or not the level sensor output value FL changes since fuel of the fuel consumption quantity required to pass through the dead zone range or more has been consumed, there is a possibility to carry out erroneous determination in the dead zone range.

However, in the sub tank range or the main tank range in which the level sensor output value FL changes with good response as the fuel is consumed, there is no need to wait for fuel of the fuel consumption quantity required to pass through the dead zone range or more to be consumed when to carry out the failure diagnosis of the fuel level sensor 3. For that reason, in a case where it tends to deter mine whether or not the level sensor output value FL changes in all of the ranges since fuel of the fuel consumption quantity required to pass through the dead zone range or more is consumed, the number of times of execution of the failure diagnosis is reduced.

Accordingly, like the present embodiment, by distinguishing the failure determining threshold value in the dead zone range from the failure determining threshold values in the sub tank range and the main tank range, and making the failure determining threshold values in the sub tank range and the main tank range smaller compared with the failure determining threshold value in the dead zone range, it is possible to increase the number of times of execution of the failure diagnosis, and this makes it possible to ensure an execution frequency of the failure diagnosis.

Although the embodiment of the present invention has been explained as described above, the embodiment described above merely illustrates a part of examples of the application of the present invention. The technical scope of the present invention should not be limited to the specific configurations of the embodiment described above.

The present application claims priority based on Japanese Patent Application No. 2012-172258, filed with the Japan Patent Office on Aug. 2, 2012, the entire content of which is expressly incorporated herein by reference.

The invention claimed is:

1. A failure diagnosis apparatus for a fuel level sensor, the fuel level sensor detecting a fuel remaining quantity within a fuel tank, the fuel tank including at least a first tank and a second tank, the failure diagnosis apparatus comprising:
   a range determining unit for determining a range of a fuel remaining quantity on the basis of an output value of the fuel level sensor, the range being classified into a plurality of ranges in accordance with an output characteristic of the fuel level sensor; and
   a range failure diagnosis unit for carrying out failure diagnosis of the fuel level sensor for each range by comparing a fuel consumption quantity since the ranges of a fuel remaining quantity are changed with a failure determining threshold value individually set up for each range,
   wherein in a dead zone range, in which a change in the output value of the fuel level sensor becomes smaller than the change before a fuel consumer is switched from the first tank to the second tank when the fuel consumer is switched, the range failure diagnosis unit sets the failure determining threshold value to a value corresponding to a fuel consumption quantity required to pass through the dead zone range.

2. The failure diagnosis apparatus for a fuel level sensor according to claim 1, further comprising:
   a normal failure diagnosis unit for carrying out failure diagnosis of the fuel level sensor regardless of the range by regularly comparing an amount of change in the fuel level sensor with a predetermined normal failure determining threshold value.

3. The failure diagnosis apparatus for a fuel level sensor according to claim 2,
   wherein when the range is a range in which fuel in the first tank or the second tank is consumed, the range failure diagnosis unit sets the failure determining threshold value to a value corresponding to a fuel consumption quantity necessary for the output value of the fuel level sensor to change by the normal failure determining threshold value in the corresponding range.

4. A failure diagnosis method for a fuel level sensor, the fuel level sensor detecting a fuel remaining quantity within a fuel tank, the fuel tank including at least a first tank and a second tank, the failure diagnosis method comprising:
   a range determining step of determining a range of a fuel remaining quantity on the basis of an output value of the fuel level sensor, the range being classified into a plurality of ranges of the fuel remaining quantity in accordance with an output characteristic of the fuel level sensor; and
   a range failure diagnosis step of carrying out failure diagnosis of the fuel level sensor for each range by comparing a fuel consumption quantity since the ranges are changed with a failure determining threshold value individually set up for each range,
   wherein in the range failure diagnosis step, the failure determining threshold value is set to a value corresponding to a fuel consumption quantity required to pass through a dead zone range in the dead zone range in which a change in the output value of the fuel level sensor becomes smaller than the change before a fuel consumer is switched from the first tank to the second tank when the fuel consumer is switched.

* * * * *